United States Patent [19]
Beach

[11] Patent Number: 5,818,359
[45] Date of Patent: Oct. 6, 1998

[54] PROCESS AND APPARATUS FOR COMPUTERIZING TRANSLATION OF MOTION OF SUBCUTANEOUS BODY PARTS

[76] Inventor: Kirk Beach, 4023 Meridian Ave. North, Seattle, Wash. 98103

[21] Appl. No.: 728,579

[22] Filed: Oct. 10, 1996

Related U.S. Application Data

[63] Continuation-in-part of Ser. No. 500,673, Jul. 10, 1995, abandoned.

[51] Int. Cl.⁶ .......................... H03K 17/94; H03M 11/00
[52] U.S. Cl. .................. 341/21; 340/407.1; 340/540; 340/825.19; 128/774
[58] Field of Search .................................. 341/20, 21, 31; 340/407.1, 407.2, 540, 825.19; 128/774, 782

[56] References Cited

U.S. PATENT DOCUMENTS

| | | | |
|---|---|---|---|
| 3,854,131 | 12/1974 | Vanderheiden et al. | 341/21 |
| 4,757,543 | 7/1988 | Nasiff | 128/782 |
| 4,905,001 | 2/1990 | Penner | 341/21 |
| 4,937,444 | 6/1990 | Zimmerman | 341/31 |
| 5,047,952 | 9/1991 | Kramer et al. | 341/20 |
| 5,097,252 | 3/1992 | Harville et al. | 340/407 |
| 5,212,372 | 5/1993 | Quick et al. | 341/20 |
| 5,368,042 | 11/1994 | O'Neal et al. | 128/782 |
| 5,515,858 | 5/1996 | Myllymaki | 128/774 |

*Primary Examiner*—Jeffery Hofsass
*Assistant Examiner*—Timothy Edwards, Jr.
*Attorney, Agent, or Firm*—Robert W. Beach

[57] ABSTRACT

Apparatus for tracking the motion of subcutaneous body parts such as tendons in the carpal tunnel of the wrist by use of an ultrasonic sensor, and supplying signals from such sensor to a computer for comparison with reference data in a memory and utilizing the output of the computer to drive a readout such as a visual display or printing of text corresponding to motions of the subcutaneous body parts such as tendons in the carpal tunnel effected by movement of the fingers as in simulated typing. Alternatively, the movement of other subcutaneous body parts such as facial muscles can be sensed, and signals generated from the sensor can be transmitted to a computer for processing to actuate or control apparatus such as an artificial limb or a motorized wheelchair.

7 Claims, 4 Drawing Sheets

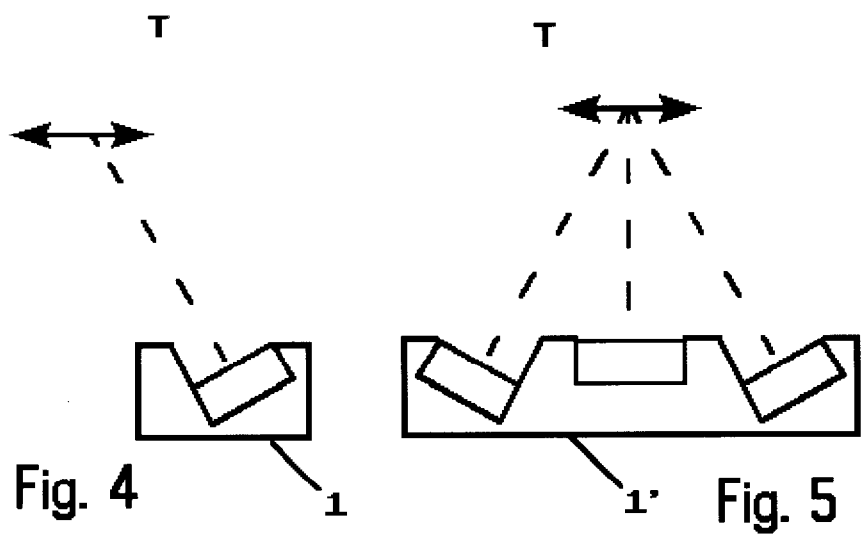

PROCESS AND APPARATUS FOR COMPUTERIZING TRANSLATION OF MOTION OF SUBCUTANEOUS BODY PARTS

This is a continuation-in-part of application Ser. No. 08/500,673 filed on Jul. 10, 1995, now abandoned.

BACKGROUND OF THE INVENTION

1. Field of the Invention

The present invention relates to utilization of motions of subcutaneous body parts to produce informational data or to effect the operation of a machine. A representative application of the invention is to utilize movement in the wrist of subcutaneous body parts attached to the fingers to produce a literal output.

2. Prior Art

Most current methods of information input to computers or other mechanisms require the manipulation of body extremity parts, such as utilization of the fingers or feet, to actuate keys, for example typewriter keys, or organ pedals. The process and apparatus of the present invention utilizes the movement of subcutaneous body parts for input rather than utilizing the movement of body extremities.

SUMMARY OF THE INVENTION

A principal object of the present invention is to provide compact apparatus for translating the motion of subcutaneous body parts into discernible information or to effect performance of a useful function.

A more specific object is to provide apparatus to effect translation of motion of subcutaneous body parts into desirable information or functional operation which has few or no moving parts.

A further object is to provide a process and apparatus for translating motion of subcutaneous body parts of people with physical limitations, including paralysis and amputation, to produce discernible information or effect functional operation.

The foregoing objects can be accomplished by apparatus including a sensor for producing signals corresponding to motions of subcutaneous body parts, a transducer for transmitting the sensor signals to a computer, a reference data memory connected to the computer for providing stored information to be compared with signals received by the computer from the transducer, and a readout which can be actuated by the computer or by an output memory in which data from the computer has been stored to provide discernible information or to effect a desired operation of mechanism.

BRIEF DESCRIPTION OF THE DRAWINGS

FIG. 4 is a diagrammatic illustration of sensors that may be applied to the wrist or other parts of the body to detect the movement of subcutaneous body parts; and FIG. 5 is a diagrammatic illustration of a body part movement sensor having a different arrangement of ultrasonic transmitters.

DETAILED DESCRIPTION

In general, the function of the process and apparatus of the present invention is to sense particular movement of subcutaneous body parts and translate such movement into discernible information or to effect specific operation of particular mechanism. An especially useful application of the process and apparatus of the present invention is for detecting the movement of a person's fingers when moving as in simulated typing and to translate such detected movement into discernible information such as a readout on a screen or a printer or to store information in a memory for subsequent retrieval.

Figure 1:
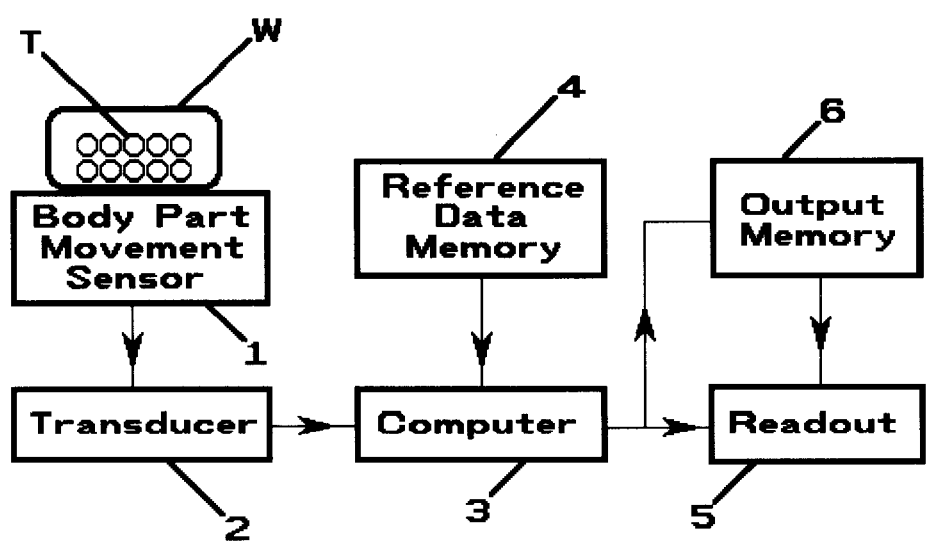
FIG. 1 is a diagram of apparatus according to the present invention which can be operated to perform functions to be accomplished by the present invention.

FIG. 1 illustrates diagrammatically apparatus which can be used to perform the process of the present invention. The operation of the apparatus is effected by sensing movement of subcutaneous body parts in the wrist W. To detect varied movement of the subcutaneous body parts, the movement sensor 1 is applied to the underside of the wrist. Such sensor develops signals corresponding to different movements of the subcutaneous body parts, in this case the flexor tendons, and drives a transducer 2 which converts the signals appropriately for feeding to a computer 3. The signals received by the computer from the transducer are compared to reference data in the memory 4, and the resulting computer output is fed to the readout 5 for effecting discernible display such as on a screen or the output of a printer. Alternatively, the output of the computer can be fed into the output memory 6 for storage to be retrieved later by transmission to the readout 5.

Figure 2:
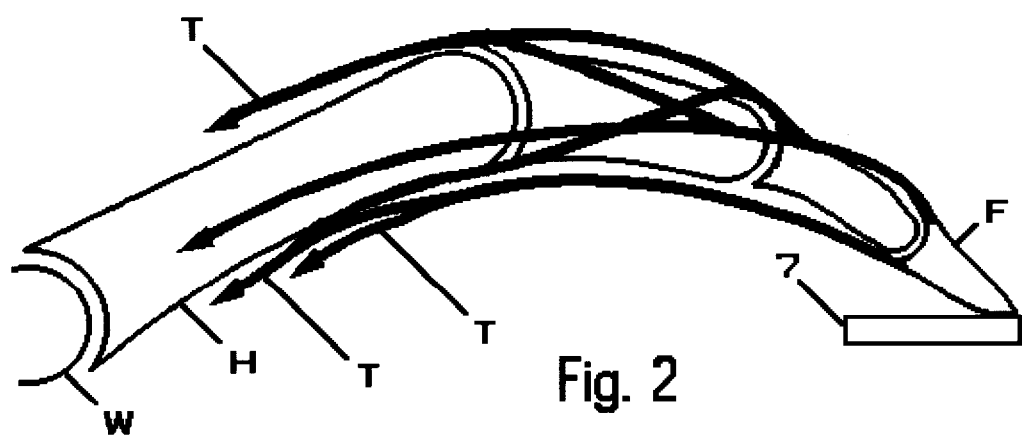
FIG. 2 is a diagrammatic vertical section through a portion of a human hand indicating finger-controlling and operating tendons.

A specific example of the apparatus and method is to produce text displayed on a screen or printed by a computer without the data being entered by fingering a keyboard. To accomplish this result, the fingers are manipulated to simulate typing, which finger manipulation can either be effected the memory of the typist or by fingering a keyboard facsimile 7 shown in FIG. 2 which may be merely a cardboard sheet.

Figure 3:
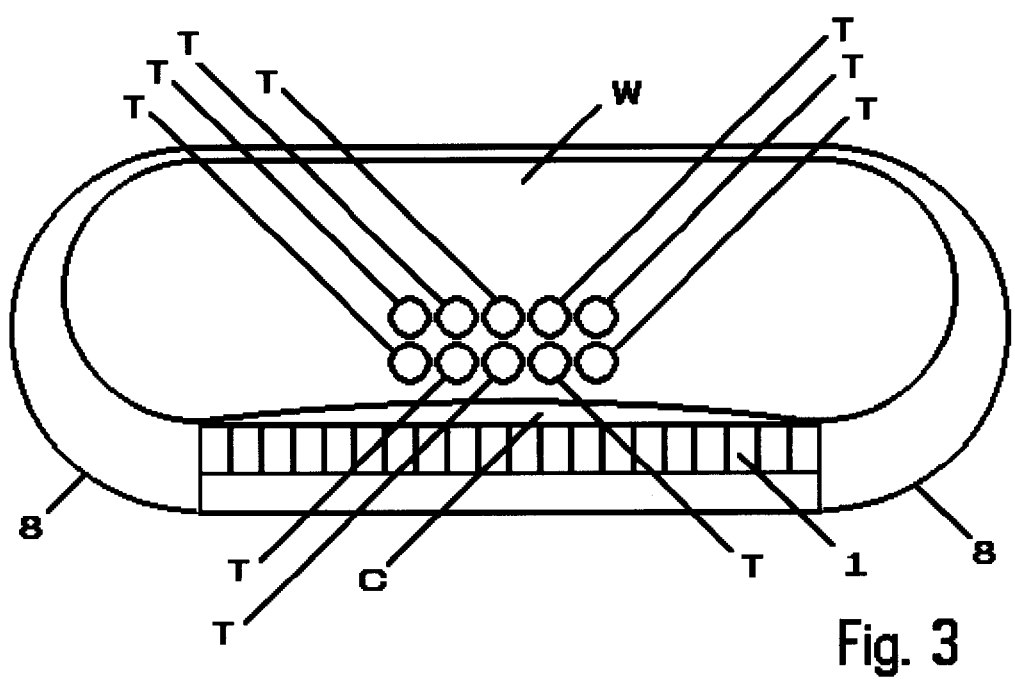
FIG. 3. is a diagrammatic transverse section through a human wrist showing a sensor attached to the wrist for detecting movement of subcutaneous body parts.

The reference data memory would be alphanumeric, such as an alphabet, the various characters of which would be associated with signal-generating means corresponding to the positions of the fingers F of the hand H which would be effected in typing. Movement of the fingers during simulated typing would move longitudinally the tendons T which are connected to the various fingers and pass through the carpal tunnel of the wrist to muscles in the proximal portions of the arm. The tendons T of the several fingers are shown diagrammatically in FIG. 3 as passing through the carpal tunnel toward which the ultrasonic sensor 1 shown in FIGS. 3 and 4 is aimed.

FIG. 4 shows one type of ultrasonic transducer array sensor 1, whereas FIG. 5 shows a different type of ultrasonic transducer array sensor 1' having three ultrasonic transducers, the beams of which intersect. In both cases the ultrasonic transducer array motion sensor is applied to the exterior of the body overlying the subcutaneous body part the movement of which is to be sensed, such as applying the array to the underside of a person's wrist and thereby sensing longitudinal extending and retracting movements in the wrist of each one of the separate individual subcutaneous tendons passing through the wrist and connected to the different fingers, respectively.

The reference data stored in the reference data memory 4 will be alphanumeric and will include different signals for the various characters corresponding, respectively, to the position of the tendon T and the finger to which it is attached that would be assumed in typing the respective corresponding letter.

When signals are generated by the ultrasonic sensor 1 and transmitted through the transducer 2 to the computer 3, that signal will be transmitted to the reference data memory for identification of the corresponding character. The computer will then generate and transmit to the readout 5 and to the output memory 6 a signal corresponding to the particular character corresponding to the position of the finger. The readout will then portray that character on a screen or have it printed by a printer so that the typist can verify the accuracy of the apparatus in interpreting a selected finger position as corresponding to a desired letter. The text resulting from successive readout signals can then be read on the screen or printed on a printer and stored in the output memory 6 for subsequent processing.

In sensing the position of each finger, it is usually necessary to sense the position of only one pair of the ten tendons T shown in FIG. 3, which are connected to a particular finger. In order to be able to sense movement of all ten tendons, the sensor 1 would be provided with an array of ultrasonic transmitters as shown in FIG. 3 to sense movement of each individual tendon, respectively. Such an ultrasonic sensor would be held to the underside of the wrist by a band or clamp 8 as shown in FIG. 3. As is customary, a contact medium jelly C is interposed between the skin and the transducer head to enable the ultrasonic beams to be transmitted into subcutaneous portions of the body and to receive returning echoes.

Instead of the sensor 1 being applied to the underside of the wrist and the readout 5 being a character readout, the subcutaneous body parts the motion of which is sensed by the sensor 1 could be facial subcutaneous body parts, and the readout could effect movement or control of body prostheses such as artificial arms or legs or could be programmed to control a powered wheelchair, for example.

I claim:

1. A process for effecting a desired action in response to motion of a subcutaneous body part, which comprises applying a motion sensor to the exterior of the body overlying such subcutaneous body part and thereby sensing movement of such subcutaneous body part relative to the body exterior which it underlies, generating a signal by such sensed movement, interpreting such signal with reference to the motion of the subcutaneous body part sensed, and effecting the action corresponding to such interpretation of the signal.

2. The process defined in claim 1, in which the motion sensor includes an ultrasonic transducer array, applying the ultrasonic transducer array to the exterior of the underside of a person's wrist and thereby sensing longitudinal extending and retracting movements in the wrist of each one of the separate individual subcutaneous tendons passing through the wrist and connected to the different fingers, respectively, and identifying such movement of each tendon independently of such movements of the other tendons, which movements correspond to bending and swinging movements of the individual fingers, respectively, relative to the metacarpus.

3. The process defined in claim 1, including applying the motion sensor to an external portion of the face and thereby sensing movement of a facial subcutaneous body part relative to the exterior of the face and effecting movement or control of an artificial limb attached to the body corresponding to the interpretation of the signal generated by the motion sensor in response to movement of such facial subcutaneous body part.

4. The process defined in claim 1, in which the motion sensor includes an ultrasonic transducer array, applying the ultrasonic transducer array to the exterior of the body overlying the subcutaneous part the movement of which is to be sensed, and thereby sensing movements of such subcutaneous body part, and identifying such movements of such subcutaneous body part sensed by the motion sensor.

5. Apparatus for effecting a desired action in response to movement of a subcutaneous body part relative to the body exterior overlying it, comprising movement-sensing means adapted for application to the exterior of the body overlying such subcutaneous body part for sensing movement of such subcutaneous body part relative to the body exterior which it underlies and producing signals corresponding to such movement, interpretation means for interpreting such signals from said movement-sensing means corresponding to a specific action to be accomplished, and actuating means controlled by said interpretation means and operable to effect the specific action corresponding to the interpretation of the signals produced by said sensing means.

6. The apparatus defined in claim 5, in which the motion-sensing means includes an ultrasonic transducer array adapted for application to the underside of a person's wrist which is capable of sensing longitudinal extending and retracting movements in the wrist of each one of the separate individual subcutaneous tendons passing through the wrist and connected to the different fingers, respectively, and of identifying such movement of each tendon independently of such movements of the other tendons, which movements correspond to bending and swinging movements of the individual fingers, respectively, relative to the metacarpus, and means for attaching the motion-sensing means to a person's wrist in contact with the underside thereof over the carpal tunnel to enable such sensing of such movements of the individual tendons.

7. Apparatus for effecting a desired action in response to motion of a subcutaneous body part, comprising movement-sensing means including an ultrasonic transducer array adapted for application to the exterior of the body overlying such subcutaneous body part for sensing movement of such subcutaneous body part relative to the body exterior which it underlies and producing signals corresponding to such movement, a computer, interpretation means for interpreting such signals and transmitting such interpreted signals from said movement-sensing means to said computer, and readout means driven by said computer for effecting the specific action corresponding to the interpretation by said interpretation means of the signals produced by said movement-sensing means.

* * * * *